United States Patent [19]

O'Mara

[11] 3,795,758

[45] Mar. 5, 1974

[54] HIGH VOLTAGE CABLE JOINT AND HEAT SINK SLEEVE FOR USE THEREIN

[75] Inventor: Joseph B. O'Mara, New York, N.Y.

[73] Assignee: The Anaconda Company, New York, N.Y.

[22] Filed: June 8, 1973

[21] Appl. No.: 368,395

[52] U.S. Cl............... 174/73 R, 29/628, 174/22 R
[51] Int. Cl............................................ H02g 15/24
[58] Field of Search.. 174/21 R, 22 R, 73 R; 29/628

[56] References Cited
UNITED STATES PATENTS

| | | | |
|---|---|---|---|
| 2,967,899 | 1/1961 | Priaroggia | 174/22 R |
| 3,051,770 | 8/1962 | Palmieri | 174/22 R |
| 3,499,100 | 3/1970 | O'Mara | 174/73 R |
| 3,667,119 | 6/1972 | Cleaver et al. | 29/628 |
| 3,688,397 | 9/1972 | Cleaver et al. | 29/628 |

Primary Examiner—Laramie E. Askin
Attorney, Agent, or Firm—V. F. Volk

[57] ABSTRACT

In a joint in high-voltage cables with aluminum conductors a finned sleeve serves as a heat sink for butt welding the conductors and becomes permanently welded to them. The sleeve has a radial projection that makes electrical contact with an electrostatic shield embedded in a thick-walled dielectric cylinder surrounding the weldment.

8 Claims, 3 Drawing Figures

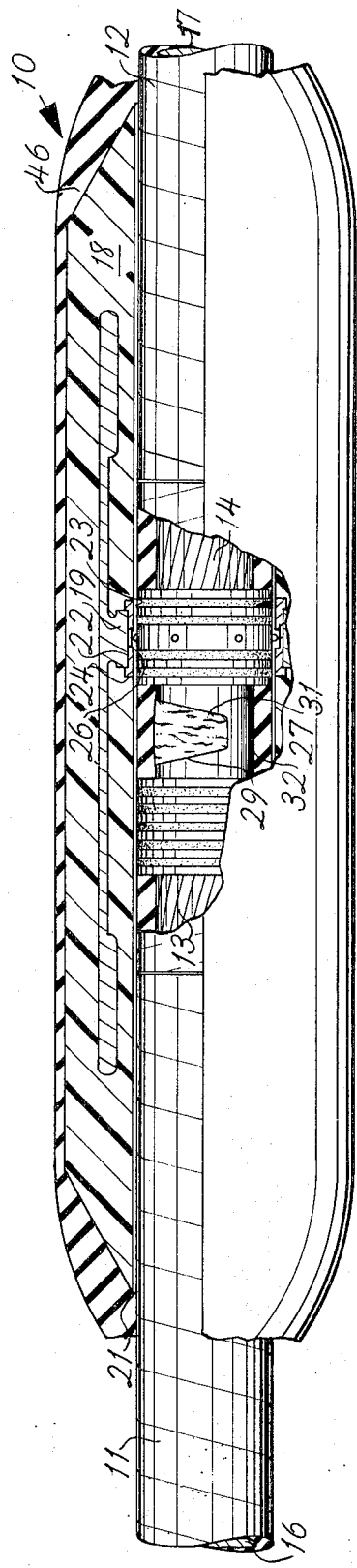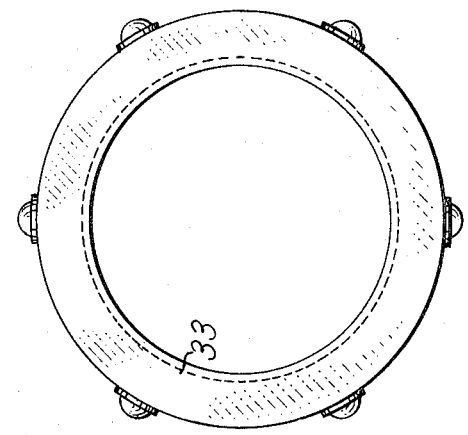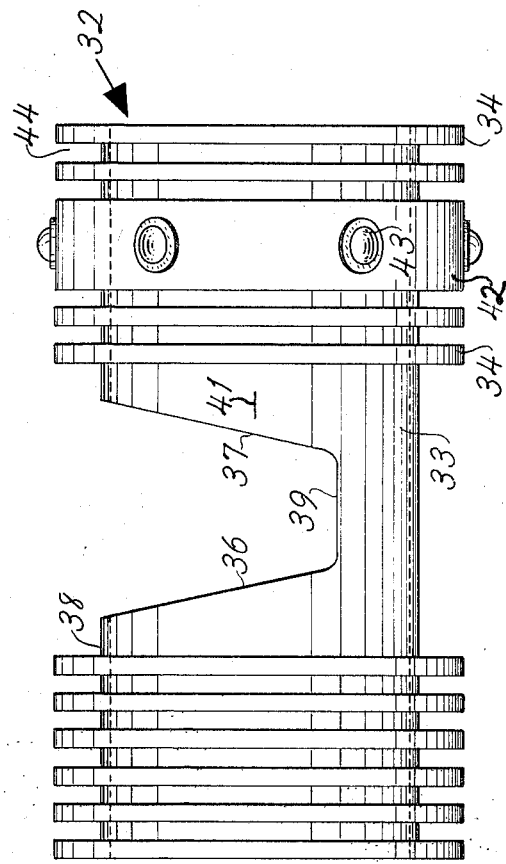

HIGH VOLTAGE CABLE JOINT AND HEAT SINK SLEEVE FOR USE THEREIN

BACKGROUND OF THE INVENTION

High voltage cable joints are well known, of which those described in U.S. Pat. Nos. 2,967,899, 3,051,770 and 3,499,100, the disclosures of which are incorporated herein by reference, may be considered exemplary, wherein the spliced sections of copper cable conductors are shielded by a metal cylinder embedded in a thick-walled dielectric casting. The cylinder is retained at the same electrical potential as the cable conductor by metal connections that extend radially through the wall of dielectric and any other insulation that is applied over the splice at the sectional plane where the two conductors are butted together. In these known joints, the splices in the copper conductors themselves are made by means of crimped copper sleeves in a known manner. For cables with aluminum conductors, however, crimped sleeves are not satisfactory because of the softness and high creep rate of aluminum. It has been known, as in U.S. Pat. No. 3,667,119, to splice aluminum conductors together by arc welding, and, in cable joints where sufficient radial space is available around the splice, to make use of heat sinks to prevent high welding temperatures from damaging the cable insulation. Prior to the present invention, however, it has not been practicable to employ embedded shield type of joints for aluminum conductor high-voltage cables.

SUMMARY

I have invented a joint for connecting two high-voltage cables comprising aluminum conductors comprising a weldment connecting the abutted ends of the conductors, walls of cable insulation surrounding both of the conductors from points spaced equally from the weldment, a thick-walled dielectric cylinder surrounding the weldment and portions of the walls of insulation, and a tubular electrostatic shield embedded in the cylinder and extending over a fraction of the portions of walls that are surrounded by the cylinder itself. My joint also comprises an inward radial projection through the cylinder from the shield. This projection is substantially displaced axially from the center of the shield and from the weldment. And my joint also comprises a metal sleeve, directly surrounding the conductors, the metal of which is fused with the weldment and which comprises an outward radial projection axially offset from the weldment and in electrical contact with the inward projection from the shield. Preferably, my joint comprises a plurality of integral fins radially projecting from the sleeve.

I have invented a sleeve for use in my joint comprising a thick-walled metal cylinder, preferably comprising aluminum, comprising sloping walls defining a central open cut extending from one surface substantially past the diameter of the cylinder. My sleeve comprises heat sink means, preferably integral therewith, such as a plurality of radial fins extending from the cylinder on both sides of the cut, and electrical contact means extending from the cylinder on one side of the cut radially beyond the extension of the heat sink means.

BRIEF DESCRIPTION OF THE DRAWING(S)

FIG. 1 shows a sectionalized lengthwise view of a joint of my invention.

FIG. 2 shows a side view of a sleeve of my invention.

FIG. 3 shows an end view of the sleeve of FIG. 2.

DETAILED DESCRIPTION OF PREFERRED EMBODIMENT

Referring first to FIG. 1 a joint, indicated generally by numeral 10 between two cables 11 and 12 having respective aluminum conductors 13 and 14 covered by walls 16, 17 of oil saturated paper insulation, includes a thick-walled polymeric cylinderical molding or casting 18 within which is embedded a tubular metal shield 19. The molding 18 has high dielectric strength and is molded from some material such as an epoxy or polyester, that may be fiber or filler reinforced in a known manner, which will not soften or dissolve in cable oils at cable operating temperatures. The molding 18 is performed and can be purchased commercially to fit any desired cable size, with an inside bore 21 of the molding sized to fit closely over the insulated cables 11, 12. The shield 19 is completely covered and insulated by the polymeric material of the molding 18 except for an inwardly radially projecting portion 22 of the shield which comprises a metal collar 23. Different thicknesses of collars 23 provide means of adjusting to different dimensions of the bore 21. The portion 22 and collar 23 combine to form an inward radial extension 24 of the shield 19 that passes through the insulation of the molding 18 on its inside surface and provides a flat contact area 26 for energizing the shield 19 at conductor potential.

The ends of the conductors 13, 14 have been butted at a section 27 and welded together by an inert gas "MIG" weldment 29 which includes a filling of weld metal 31. An aluminum sleeve 32 has served as a heat sink during the welding and been fused to the weld metal 31. The sleeve 32, shown particularly in FIGS. 2 and 3, comprises a metal cylinder 33 with a wall thickness sufficient to serve as a conductor of welding heat from the surface of the conductor 13, 14 to a plurality of radial fins which serve as sinks and means for dispersing the heat of welding to the environment. The walls of the cylinder 33 are cut on sloping surfaces 36, 37 from an upper surface 38 of the cylinder 33 to a horizontal portion 39 situated substantially below a diameter 41 of the cylinder 33. I have shown six of the fins 34 on the left side of my sleeve 32 although a greater or lesser number of fins can be used within the scope of my invention, but on the right side I have displaced two of the fins and the space between them with a unit 42 having projecting contact balls 43 outwardly urged by internal compression springs, not shown, and dimensioned to engage the area 26. The unit 42 is convenient but other units such as the units having a flexible collar such as is described in U.S. Pat. No. 3,499,100 may be used as long as they comprise contact members such as the balls 43 which extend radially beyond the fins 34 sufficiently to make electrical contact with the inward projection 22 of the shield 19. For the purpose of achieving the maximum rate of heat transfer I prefer to have the fins 34 integral with the cylinder 33 but instead of separate fins they may be combined to form a solid block on each side of the weldment. These would serve as heat sinks for the sensitive heat of welding without dissipating the heat as efficiently as the illustrated fins. In order to allow the sleeve 32 to provide the contact means between the conductors 13, 14 and the shield 19 the different members are unsymmetrical, with the projecting portion 22 being off center to the right of the shield 19.

To make my joint 10, equal lengths of the cable insulation are removed from the cables 11, 12 to expose the conductors 13, 14. The conductors are each cut at an oblique angle and surface welded to secure the individual wire strands in a known manner. The molding 18 containing the molded-in shield 19 and collar 23, pre-bored to the proper internal diameter, is fitted over one of the cables and pushed away from the welding area. The sleeve 32 is fitted over one of the conductors. The projecting edges of the cut ends of the conductor are abutted and the sleeve fitted so that the butt joint bisects the portion 39. Aluminum weld metal is fused onto the conductors and the sleeve 32, building up a solid weldment between the surfaces 36, 37. After the weld has sufficiently cooled, slots 44 between the fins 34 are filled with electrical insulation. I have found that preformed split rings of polyfluorocarbon composition are suitable to fill the slots 44 but rolled wads of crepe paper may be used and the crepe paper also wrapped over the exposed metal to the diameter of the cable insulation 16, 17. The molding 18 is then moved back over the cable, on which it has been temporarily set aside, until the balls 43 engage the surface 26. Thereafter the molding 18 is secured in place by additional wrappings 46 of paper insulating tape in the usual manner.

The foregoing description has been exemplary rather than definitive of my invention for which I desire an award of letters patent as defined in the following claims.

I claim:

1. A joint connecting two high-voltage cables comprising aluminum conductors comprising:
   A. a weldment connecting abutted ends of said conductors,
   B. walls of cable insulation surrounding both of said conductors from points axially spaced from said weldment,
   C. a thick-walled dielectric cylinder surrounding said weldment and portions of said walls,
   D. a tubular electrostatic shield embedded in said cylinder and extending over a fraction of said portions,
   E. an inward radial projection from said shield through said cylinder, said projection being substantially displaced axially from the center of said shield, and from said weldment,
   F. a metal sleeve directly surrounding said conductors,
      1. the metal of said sleeve being fused with said weldment,
      2. said sleeve comprising an outward radial projection axially offset from said weldment, in electrical contact with said inward projection from said shield.

2. The joint of claim 1 wherein said sleeve comprises a plurality of radially projecting fins.

3. A sleeve for use as a combined heat sink and shield contacting means in a high voltage cable joint comprising,
   A. thick-walled metal cylinder,
   B. sloping walls defining a central open cut in said cylinder, said cut extending from one surface through said cylinder substantially past the diameter thereof,
   C. heat sink means extending from said cylinder on both sides of said cut,
   D. electrical contact means extending from said cylinder on one side of said cut beyond the extension of said heat sink means.

4. The sleeve of claim 3 wherein said heat sink means comprises a plurality of radial fins.

5. The sleeve of claim 3 wherein said heat sink means is integral with said cylinder.

6. The sleeve of claim 5 wherein said heat sink means comprises a plurality of radial fins.

7. The sleeve of claim 6 wherein said metal is aluminum.

8. The sleeve of claim 3 wherein said metal is aluminum.

* * * * *